United States Patent
Liao

(10) Patent No.: US 12,460,765 B2
(45) Date of Patent: Nov. 4, 2025

(54) UNIVERSAL ADJUSTER

(71) Applicant: Tsun-Chi Liao, Taichung (TW)

(72) Inventor: Tsun-Chi Liao, Taichung (TW)

(*) Notice: Subject to any disclaimer, the term of this patent is extended or adjusted under 35 U.S.C. 154(b) by 45 days.

(21) Appl. No.: 18/406,464

(22) Filed: Jan. 8, 2024

(65) Prior Publication Data
US 2025/0224070 A1    Jul. 10, 2025

(51) Int. Cl.
*F16M 11/04* (2006.01)
*F16M 11/06* (2006.01)
*G10D 13/10* (2020.01)
*H04R 1/08* (2006.01)

(52) U.S. Cl.
CPC ........... *F16M 11/041* (2013.01); *F16M 11/06* (2013.01); *G10D 13/28* (2020.02); *H04R 1/08* (2013.01)

(58) Field of Classification Search
CPC ....... F16M 11/041; F16M 11/06; F16B 2/065; Y10T 403/32286; Y10T 403/32532; Y10T 403/7067
USPC ... 248/274.1, 276.1, 288.11, 288.31, 289.11, 248/291.1, 292.11, 280, 11; 84/453
See application file for complete search history.

(56) References Cited

U.S. PATENT DOCUMENTS

| | | | |
|---|---|---|---|
| 11,330,352 B2 | 5/2022 | Athan | |
| 2013/0174711 A1* | 7/2013 | Lin | G10D 13/063 84/422.3 |
| 2014/0116230 A1* | 5/2014 | Nakata | F16M 11/125 84/453 |

FOREIGN PATENT DOCUMENTS

TW    I721869    3/2021

* cited by examiner

*Primary Examiner* — Alfred J Wujciak
(74) *Attorney, Agent, or Firm* — MUNCY, GEISSLER, OLDS & LOWE, P.C.

(57) ABSTRACT

A universal adjuster includes a pivot rod, two clamping housings, two C-shaped rings, two side housings, a pressing column, and a locking operating element. The clamping housings surround the pivot rod and jointly form a clamping ring having a first rotational degree of freedom relative to the pivot rod. Two sides of the clamping ring respectively include a circular outer surface, and the C-shaped rings are rotatably sleeved on the two circular outer surfaces to have a second rotational degree of freedom. The side housings cover the clamping ring and are jointly assembled to form an outer housing. The pressing column disposed in the outer housing simultaneously abuts the C-shaped rings. The locking operating element spirally passes through the outer housing and abuts the pressing column to press the C-shaped rings to tighten the clamping ring to secure a relative position of the outer housing and the pivot rod.

9 Claims, 5 Drawing Sheets

UNIVERSAL ADJUSTER

FIELD OF THE INVENTION

The present invention relates to a universal adjuster, particularly to angle adjustment and tightening structure of the universal adjuster.

BACKGROUND OF THE INVENTION

In the course of the performance, musical instruments and auxiliary equipment are fixed in the performance venue with various brackets to facilitate the use of the performers during the performance. For example, in order to secure a microphone used in a performance, a bracket such as U.S. Pat. No. 11,330,352 B2 is used.

In order to facilitate the adjustment of the placement angle of the equipment, a universal adjustment is provided between the bracket and the equipment, and a known universal adjustment, such as Taiwan Patent No. 1721869, "Universal Joint Assembly", includes a base, two clamping members, a ball shaft, and a locking member. The locking member drives the two clamps to move towards the ball shaft to clamp the ball shaft so that the ball shaft is fixed in place relative to the base.

In the mechanism described above, the ball shaft includes a universal rotational degree of freedom relative to the base. When the ball shaft is adjusted to a specific angle, the locking member can be used to drive the two clamping members to clamp and secure the ball shaft, however, when the two clamping members overly squeeze the ball shaft, the ball shaft will be partially dented and deformed, which may result in the ball shaft not being able to be adjusted or difficult to be adjusted to a specific angle relative to the base, or the two clamping members will not be able to stably clamp and secure the ball shaft that may easily be loosened.

SUMMARY OF THE INVENTION

The main object of the present invention is to solve a problem that the conventional universal adjuster would find difficult to adjust angles or easily loosen due to deformation.

In order to achieve the above object, the present invention provides a universal adjuster, including a pivot rod, two clamping housings, two C-shaped rings, two side housings, a pressing column, and a locking operating element. The pivot rod includes a center axis, and the two clamping housings surround the pivot rod by two sides of the center axis to form a gap and jointly form a clamping ring. The clamping ring includes a first rotational degree of freedom relative to the pivot rod, and the first rotational degree of freedom rotating around the center axis. Two sides of the clamping ring are respectively provided with a circular outer surface. The two C-shaped rings are respectively sleeved on two circular outer surfaces to be rotatable to include a second rotational degree of freedom, and a rotational axis of the second rotational degree of freedom is perpendicular to a rotational axis of the first rotational degree of freedom. The two C-shaped rings are respectively provided with a fixed end and a pressed end located on two ends thereof, and a spacing is disposed between the fixed end and the pressed end.

The two side housings cover the clamping ring and are jointly assembled with each other to form an outer housing, and each of the two side housings is provided with an accommodation space for accommodating one of the two C-shaped rings. Each of the two side housings is provided with a flange in the accommodation space, and the flange abuts against a side of the fixed end which is opposite to the pressed end. The pressing column is disposed in the outer housing, and the pressing column simultaneously presses sides of the pressed end of the two C-shaped rings which are opposite to the fixed ends. The locking operating element spirally passes through the outer housing and abuts against the pressing column, and the pressed end of each of the two C-shaped rings is pressed by the pressing column to make the outer housing move together with the two C-shaped rings, and meanwhile, the spacing of each of the two C-shaped rings is shortened to tighten the clamping ring by the two C-shaped rings, so as to secure a relative position of the outer housing and the pivot rod.

Accordingly, the outer housing includes the first rotational degree of freedom and the second rotational degree of freedom relative to the pivot rod so as to be adjusted in all directions. By only rotating the locking operating element to drive the two C-shaped rings to tighten the clamping ring or not, and a direction in which the two C-shaped rings tightening the clamping ring is the same as a direction of the second rotational degree of freedom, such that a problem that the two C-shaped rings are not rotatable along the second rotational degree of freedom because of the clamping ring is dented and deformed can be avoided. Therefore, the invention is not only simple to operate and without a problem that angle can not be adjusted due to the deformation.

DETAILED DESCRIPTION OF THE PREFERRED EMBODIMENTS

The technical contents of the present invention are described as follows with reference to the accompanying drawings.

Figure 1:
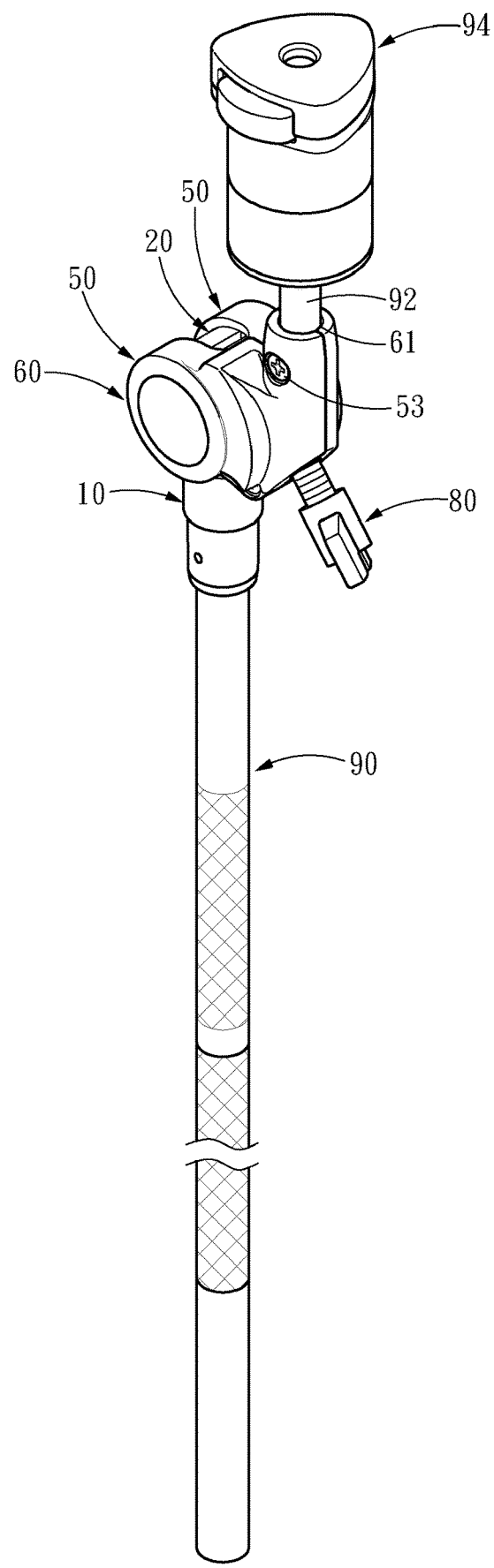
FIG. 1 is a schematic view of the three-dimensional structure of an embodiment of the present invention.
Figure 2:
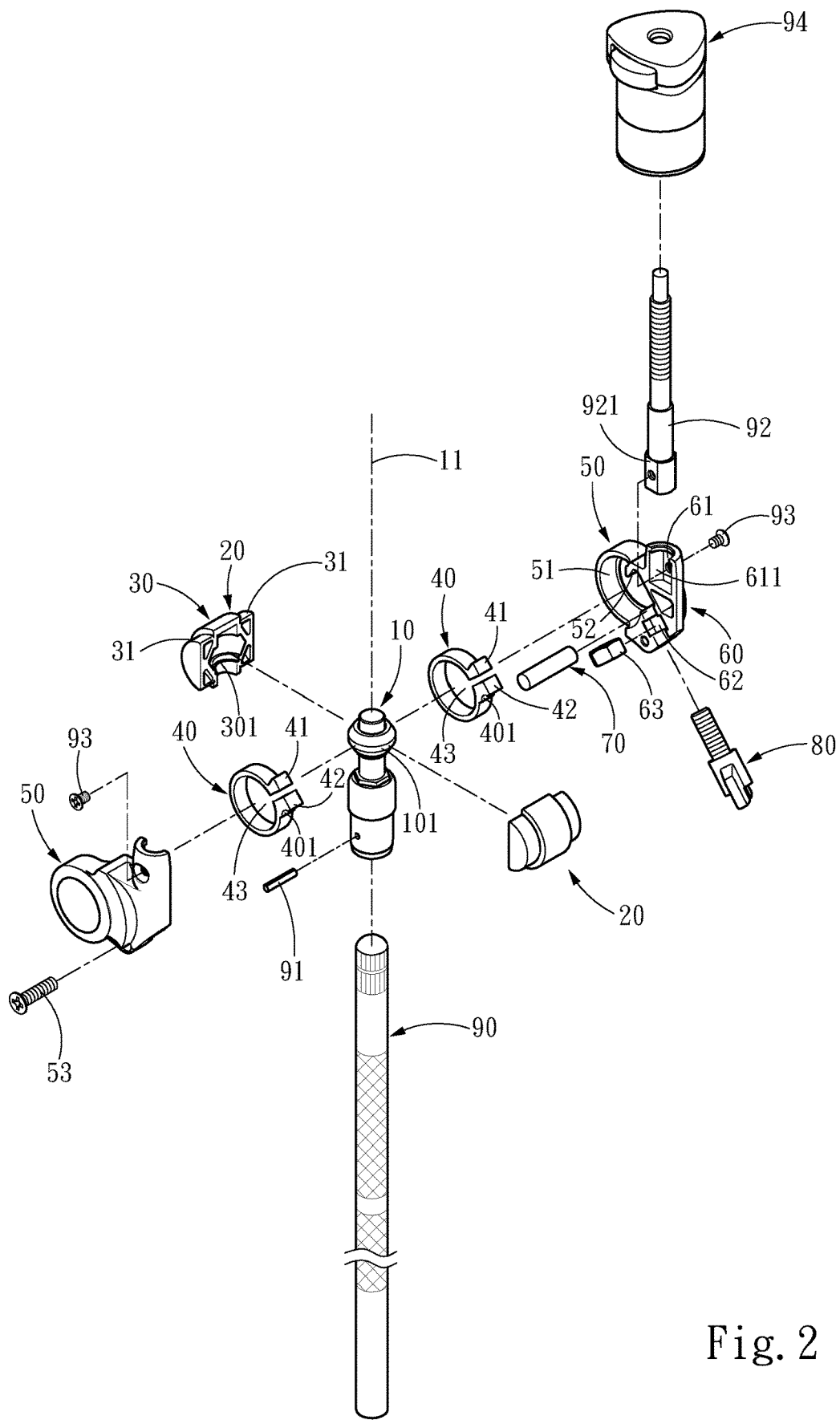
FIG. 2 is an exploded schematic view of an embodiment of the present invention.
Figure 3:
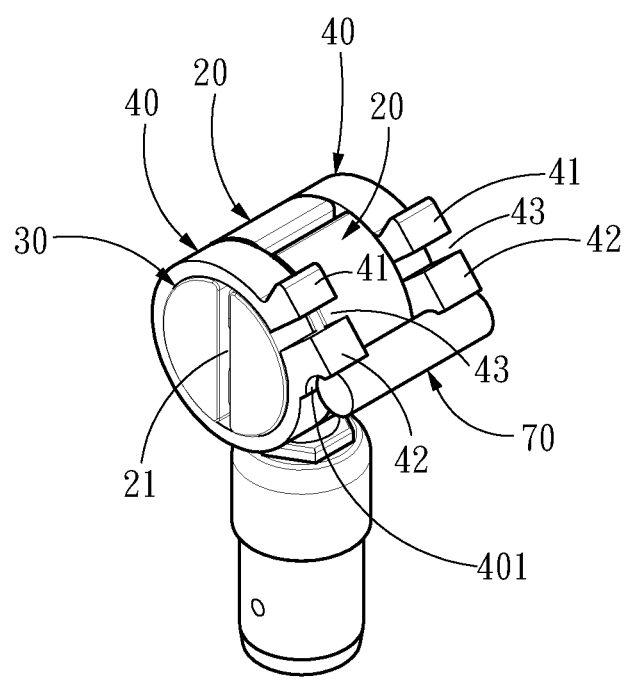
FIG. 3 is a schematic view of a local structure assembly of an embodiment of the present invention.

Please refer to FIG. 1, FIG. 2, and FIG. 3, the present invention provides a universal adjuster, including a pivot rod 10, two clamping housings 20, two C-shaped rings 40, two side housings 50, a pressing column 70, and a locking operating element 80. The pivot rod 10 includes a center axis 11, the two clamping housings 20 surround the pivot rod 10 by two sides of the center axis 11 to form a gap 21, and the two clamping housings 20 jointly form a clamping ring 30. The clamping ring 30 includes a first rotational degree of freedom relative to the pivot rod 10, and the first rotational degree of freedom rotates around the center axis 11. In one embodiment, the pivot rod 10 is provided with an outer contour 101 with axial symmetry, and the clamping ring 30 is provided with an inner contour 301 corresponding to the outer contour 101. Contours of the outer contour 101 and the inner contour 301 are matched so that the clamping ring 30 rotates relative to the pivot rod 10 to include the first rotational degree of freedom. Two sides of the clamping ring 30 respectively include a circular outer surface 31.

The two C-shaped rings 40 are respectively disposed to sleeve on the two circular outer surfaces 31 to be rotatable to include a second rotational degree of freedom, and a rotational axis of the second rotational degree of freedom is perpendicular to a rotational axis of the first rotational degree of freedom. Each of the two C-shaped rings 40 is provided with a fixed end 41 and a pressed end 42 located on two ends thereof, and a spacing 43 is formed between the fixed end 41 and the pressed end 42.

The two side housings 50 cover the two sides of the clamping ring 30 and are jointly assembled with each other to form an outer housing 60. In one embodiment, the two side housings 50 are secured by a locking element 53. Each of the two side housings 50 includes an accommodation space 51 for accommodating one of the two C-shaped rings 40, each of the two side housings 50 is provided with a flange 52 in the accommodation space 51, and one end of the flange 52 opposite to the pressed end 42 is abutted against the fixed end 41. The pressing column 70 is disposed in the outer housing 60, so that one side of the pressing column 70 opposite to the fixed end 41 simultaneously abuts the pressed ends 42 of the two C-shaped rings 40. In one embodiment, each of the two C-shaped rings 40 includes a recessed groove 401 provided for abutting the pressing column 70.

The locking operating element 80 spirally passes through the outer housing 60 and abuts against the pressing column 70, and the pressed end 42 of each of the two C-shaped rings 40 is pressed by the pressing column 70 so that the outer housing 60 and the two C-shaped rings 40 are moved together; meanwhile, the spacing 43 of each of the two C-shaped rings 40 is shortened so as to tighten the clamping ring 30 by the two C-shaped rings 40, and thereby a relative position of the outer housing 60 and the pivot rod 10 is secured. In one embodiment, the outer housing 60 includes a locking slot 62 for locking a nut 63 spirally passed through by the locking operating element 80, and the locking slot 62 is formed by the two side housings 50 jointly assembled with each other.

Figure 4:
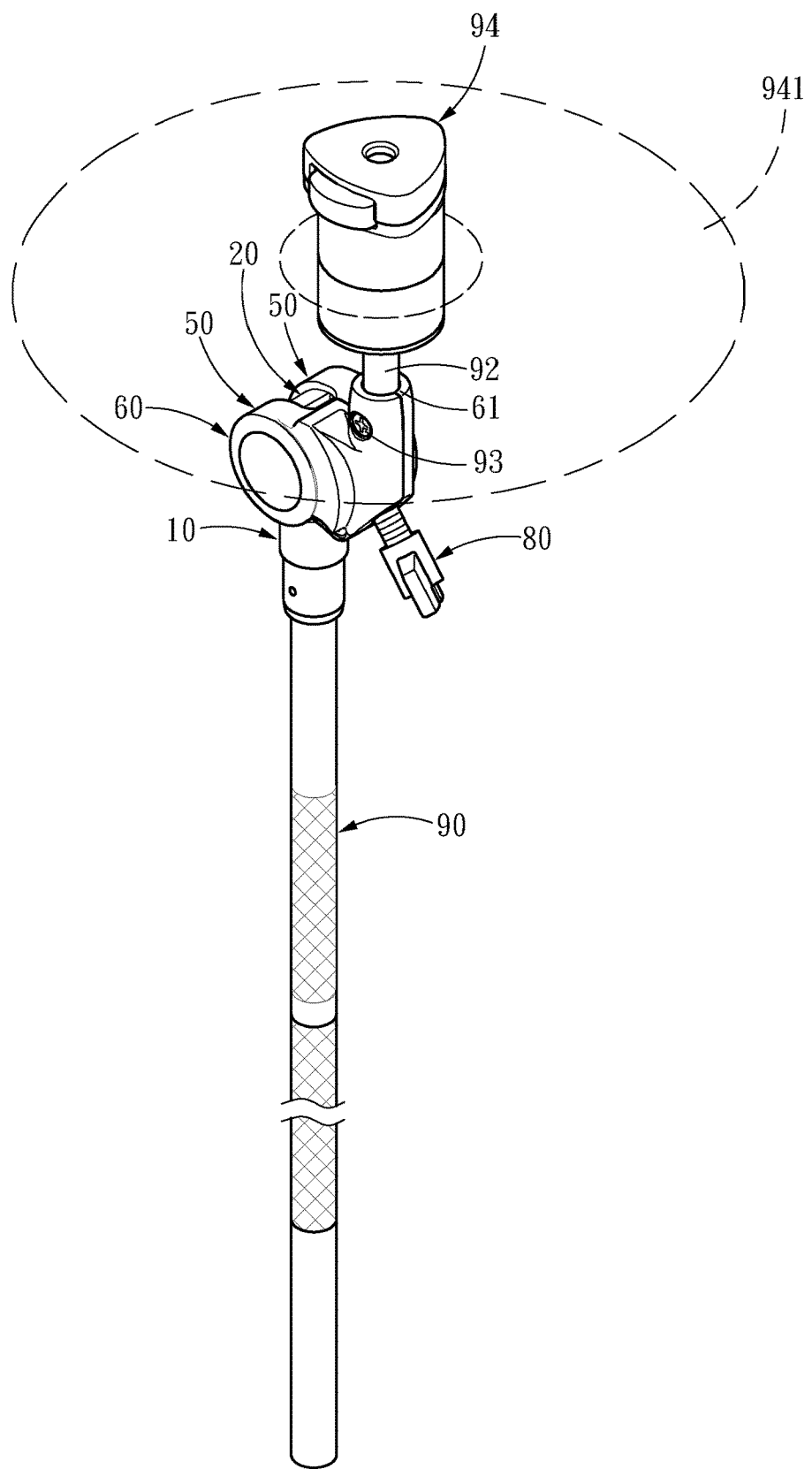
FIG. 4 is an implementation schematic view of an embodiment of the present invention.

Please refer to FIG. 4. The pivot rod 10 is disposed on a pole 90, the pivot rod 10 and the pole 90 are secured by a bolt 91. The outer housing 60 includes a carrying hole 61 provided with a carrying rod 92. The carrying rod 92 is secured to the carrying hole 61 by using at least one screw 93 transversely passing through the carrying hole 61 and locking into the carrying rod 92. In an embodiment, the carrying hole 61 is formed by the two side housings 50 jointly assembled with each other. The carrying hole 61 is provided with a non-circular inner ring surface 611, and the carrying rod 92 is provided with a non-circular outer ring surface 921 corresponding to the non-circular inner ring surface 611, and the carrying rod 92 is provided with a cymbal holder 94 thereon for clamping a cymbal 941.

Figure 5:
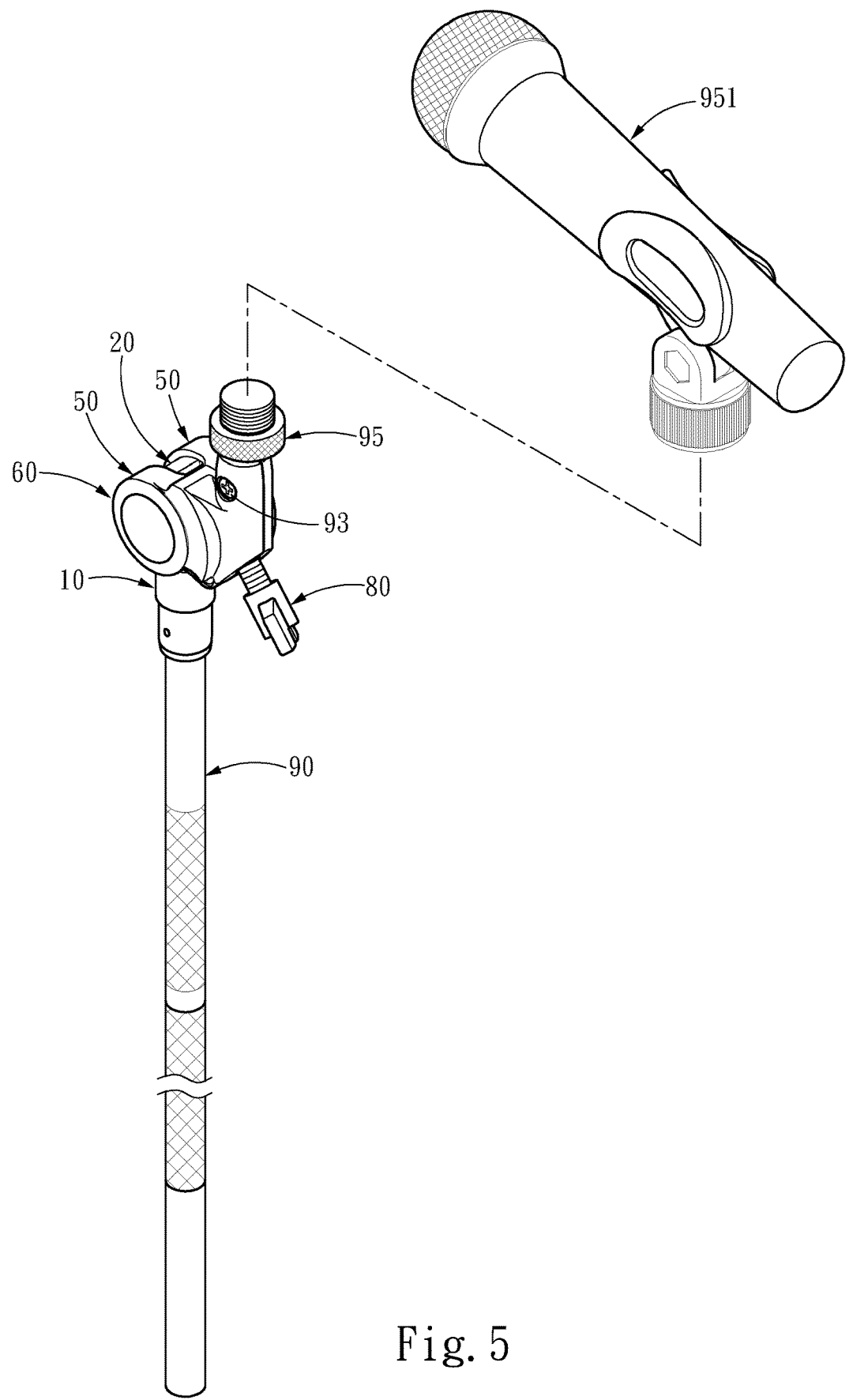
FIG. 5 is an implementation schematic view of another embodiment of the present invention.

Please refer to FIG. 5, in another embodiment, the carrying rod 92 is further provided with a microphone holder 95 thereon for clamping a microphone 951.

As mentioned above, the present invention has characteristics as follows:
1. By only rotating the locking operating element to drive the two C-shaped rings to tighten the clamping ring or not, which is quite simple in operation.
2. A direction in which the two C-shaped rings tightening the clamping ring is the same as a direction of the second rotational degree of freedom, even if the clamping ring is dented and deformed by excessively tightened by the two C-shaped rings, the two C-shaped rings are still rotatable along the second rotational degree of freedom and without a problem that angle can not be adjusted due to the deformation.

What is claimed is:
1. A universal adjuster, comprising:
a pivot rod, comprising a center axis;
two clamping housings, disposed to surround the pivot rod by two sides of the center axis and maintain a gap to jointly form a clamping ring, the clamping ring comprising a first rotational degree of freedom relative to the pivot rod, the first rotational degree of freedom rotating around the center axis, and two sides of the clamping ring respectively provided with a circular outer surface;
two C-shaped rings, respectively sleeving on the two circular outer surfaces to be rotatable to comprise a second rotational degree of freedom, a rotational axis of the second rotational degree of freedom being perpendicular to a rotational axis of the first rotational degree of freedom, each of the two C-shaped rings being provided with a fixed end and a pressed end located on two ends thereof, and a spacing formed between the fixed end and the pressed end, wherein each of the two C-shaped rings comprises a recessed groove provided for abutting the pressing column;
two side housings, covering the clamping ring and jointly assembled to form an outer housing, and each of the two side housings provided with an accommodation space for accommodating one of the two C-shaped rings, each of the two side housings provided with a flange in the accommodation space, and the flange abutting against a side of the fixed end opposite to the pressed end;
a pressing column, disposed in the outer housing, and the pressing column simultaneously pressing sides of the two pressed ends of the two C-shaped rings opposite to the fixed ends; and a locking operating element, spirally passed through the outer housing and abutted against the pressing column, and the pressed end of each of the two C-shaped rings being pressed by the pressing column to make the outer housing move together with the two C-shaped rings, and the spacing of each of the two C-shaped rings is shortened to tighten the clamping ring by the two C-shaped rings.

2. The universal adjuster according to claim 1, wherein the pivot rod comprises an outer contour with axial symmetry, and the clamping ring comprises an inner contour corresponding to the outer contour.

3. The universal adjuster according to claim 1, wherein the pivot rod is disposed on a pole, the pivot rod and the pole are secured by a bolt.

4. The universal adjuster according to claim 1, wherein the two side housings are secured by a locking element.

5. The universal adjuster according to claim 1, wherein the outer housing comprises a carrying hole provided with a carrying rod, the carrying rod is secured to the carrying hole by using at least one screw transversely extending into the carrying hole and locking into the carrying rod.

6. The universal adjuster according to claim 5, wherein the carrying hole is formed by the two side housings jointly assembled with each other.

7. The universal adjuster according to claim 5, wherein the carrying hole comprises a non-circular inner surface, and the carrying rod comprises a non-circular outer surface corresponding to the non-circular inner ring surface.

8. The universal adjuster according to claim 1, wherein the outer housing comprises a locking slot for locking a nut which is spirally passed through by the locking operating element.

9. The universal adjuster according to claim 8, wherein the locking slot is formed by the two side housings jointly assembled with each other.

* * * * *